US009191466B2

(12) United States Patent
Brzozowski

(10) Patent No.: US 9,191,466 B2
(45) Date of Patent: *Nov. 17, 2015

(54) METHOD AND APPARATUS FOR PROVIDING CONNECTIVITY IN A NETWORK WITH MULTIPLE PACKET PROTOCOLS

(71) Applicant: Comcast Cable Communications, LLC, Philadelphia, PA (US)

(72) Inventor: John Jason Brzozowski, Schwenksville, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 135 days.

This patent is subject to a terminal disclaimer.

(21) Appl. No.: 13/783,814

(22) Filed: Mar. 4, 2013

(65) Prior Publication Data

US 2013/0185449 A1 Jul. 18, 2013

Related U.S. Application Data

(63) Continuation of application No. 12/554,682, filed on Sep. 4, 2009, now Pat. No. 8,411,683.

(51) Int. Cl.
*H04L 12/28* (2006.01)
*H04L 29/06* (2006.01)
*H04L 29/12* (2006.01)
*H04J 1/16* (2006.01)

(52) U.S. Cl.
CPC .......... *H04L 69/18* (2013.01); *H04L 29/12358* (2013.01); *H04L 29/12367* (2013.01); *H04L 29/12971* (2013.01); *H04L 61/251* (2013.01); *H04L 61/2514* (2013.01); *H04L 61/6086* (2013.01); *H04L 69/08* (2013.01)

(58) Field of Classification Search
USPC .......................... 370/252, 389, 401, 419, 467
See application file for complete search history.

(56) References Cited

U.S. PATENT DOCUMENTS 5,946,308 A * 8/1999 Dobbins et al. ............... 370/392
7,380,025 B1 5/2008 Riggins et al.
2003/0106067 A1* 6/2003 Hoskins et al. ............... 725/119

(Continued)

OTHER PUBLICATIONS

Official Communication in EP10174235.1-2416 dated Dec. 1, 2011.

(Continued)

*Primary Examiner* — John Pezzlo
(74) *Attorney, Agent, or Firm* — Banner & Witcoff, Ltd.

(57) ABSTRACT

Methods and systems are provided for routing or forwarding packet data conforming to two different communication protocols simultaneously in a computer network. The first protocol may be a legacy protocol, such as IPv4, with routing being performed in a manner that maintains legacy behavior and functions. Such functions may include network address translation. The second protocol may be a newer protocol, such as IPv6, with the routing or forwarding being performed through reduced complexity bridging that enables simplified connectivity of second protocol devices. The bridging performed typically requires less memory and processing power than traditional routing techniques such as those implemented for the first protocol. Reduced memory and processing power requirements enable the second protocol routing functions to be added to legacy equipment that would not otherwise be able to support routing of the second protocol packet data.

20 Claims, 8 Drawing Sheets

(56) References Cited

U.S. PATENT DOCUMENTS

| | | | |
|---|---|---|---|
| 2004/0052216 A1* | 3/2004 | Roh | 370/252 |
| 2004/0076180 A1 | 4/2004 | Satapati et al. | |
| 2007/0127520 A1 | 6/2007 | Lioy | |
| 2008/0117855 A1 | 5/2008 | Choi et al. | |
| 2009/0245278 A1* | 10/2009 | Kee | 370/467 |
| 2010/0046474 A1* | 2/2010 | Kozakai et al. | 370/331 |
| 2014/0140342 A1* | 5/2014 | Narad | 370/389 |

OTHER PUBLICATIONS

European Search Report for EP10174235.1 dated Dec. 13, 2010.
Internet Article, <http://www.cedmagazine.com/cablelabs-issues-erouter-spec.aspx>, printed Jul. 6, 2009.
"Data-Over-Cable Service Interface Specifications", IPv4 and IPv6 eRouter Specification, <http://www.cablelabs.com/specifications/doceEROUTER.html>, May 18, 2007.
Internet article, <http://tool.ietf.org/html/draft-wbeebee-ipv6-cpe-router-00>, printed Mar. 19, 2009.
Internet article, <http://tool.ietf.org/html/draft-sbeebee-ipv6-cpe-router-01>, printed Mar. 19, 2009.
Internet article, <http://tool.ietf.org/html/draft-sbeebee-ipv6-cpe-router-02>, printed Mar. 19, 2009.
Internet article, <http://tool.ietf.org/html/draft-wbeebee-ipv6-cpe-router-03>, printed Mar. 19, 2009.
Internet article, <http://tool.ietf.org/html/draft-sbeebee-ipv6-cpe-router-04>, printed Mar. 19, 2009.

* cited by examiner

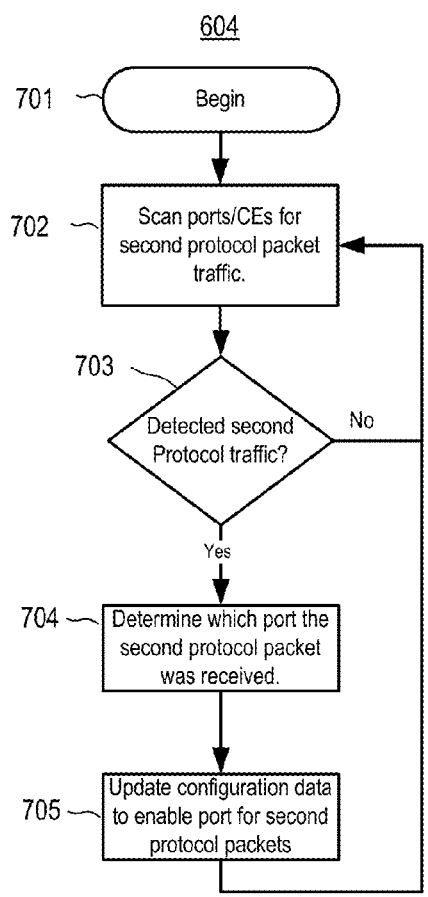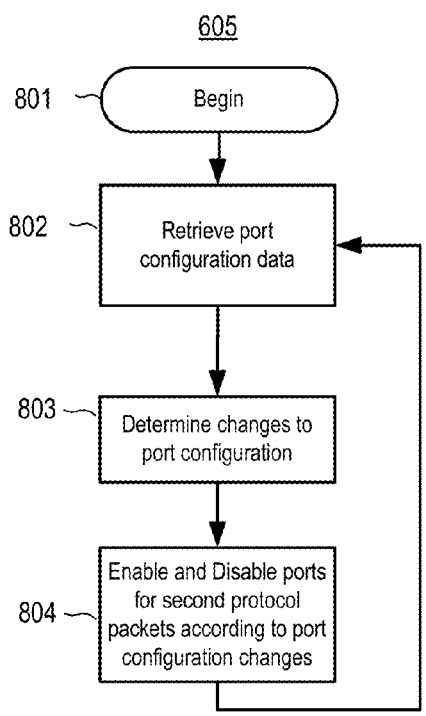
FIG. 7
FIG. 8

METHOD AND APPARATUS FOR PROVIDING CONNECTIVITY IN A NETWORK WITH MULTIPLE PACKET PROTOCOLS

RELATED APPLICATIONS

The present application is a continuation of U.S. patent application Ser. No. 12/554,682, filed Sep. 4, 2009, which is incorporated by reference herein.

FIELD

Aspects of the disclosure relate to supporting two or more communication protocols simultaneously in a computer network. More specifically, methods, apparatus, and systems are disclosed which teach how networks supporting a legacy protocol, such as IPv4, may be upgraded or adapted to support a newer protocol, such as IPv6.

BACKGROUND

In an Internet Protocol (IP) network, every host computer is assigned an IP address for identifying the host computer communications over the network. Today, in 2009, the vast majority of computers on the Internet are compatible with Internet Protocol version 4 (IPv4) which utilizes a dotted decimal format IP address field. The IPv4 address contains four numbers, each ranging from 0 to 255 (e.g. 10.1.322.65) which provide a maximum of 4,294,967,296 possible addresses. Over the past several decades, the world has witnessed a sharp increase of host computers on the Internet, including an explosion in the number of Internet connected wireless mobile devices. As a result, a depletion of unassigned IPv4 addresses available for use by new hosts has reached a critical level. This problem, commonly referred to as IPv4 address exhaustion, has been taking place in the global IPv4 address pool as well as in the IPv4 address pools assigned to regional registries around the globe.

Approximately 15 years ago, the Internet Engineering Task Force (IETF) began developing IPv6 as the intended successor to IPv4. Finalized in 1996, the new IPv6 standard provides approximately $3.4 \times 10^{38}$ addresses, which are $7.9 \times 10^{28}$ times as many addresses provided for by the IPv4 standard. While having developed IPv6, in part, to alleviate the IPv4 address exhaustion problem, the Internet community recognized that the deployment of IPv6 enabled equipment and services would take place over an extended duration and that IPv4 would remain active for many years and decades to come, needing to coexist with IPv6 until the Internet arrived at IPv6 parity with IPv4.

Accordingly, other technologies have emerged to help mitigate the problem of IPv4 address exhaustion. Notably, network address translation (NAT) has been successfully used for many years in which multiple hosts on a private network share a single IPv4 IP address on the public Internet. Using NAT, hosts on a private network behind a NAT device each have a private IP address that is only used on the private network. When one of these hosts transmits packets outside of the private network, the NAT device modifies the packets to replace the host's private IP address with a public IP address. The public IP address is shared by the entire private network such that the packets appear to come from the NAT device itself. In reply to these outbound packets with the public IP address, packets received from the public Internet will likewise be addressed to the shared public IP address. The NAT device keeps track of which host originally transmitted outbound packets to form an address mapping so that inbound packets can be reverse translated, replacing the public IP address with the correct corresponding private IP address. The NAT device then forwards the translated inbound packets to the correct host. NAT devices are often implemented in a network gateway, which is a device typically used in home networking scenarios where multiple subscriber computers are connecting to the Internet. Network gateways are sometimes referred to as home gateways. Network gateways of today most often use NAT for IPv4 to enable Internet or network connectivity, but in the future, network gateways or routers will need to support IPv6 networking which is not analogous or compatible with the current IPv4 NAT functionality.

At present, the Internet community is finding itself in a difficult situation given that technologies such as NAT are quickly becoming insufficient in dealing with the dwindling number of available public IPv4 addresses, and for a variety of reasons, the adoption rate of the IPv6 standard has been slow to the point that IPv6 capable equipment is not widely developed or deployed. Compounding the problem is the absence of content and services over IPv6. So even if a substantial quantity of Internet users were to suddenly find themselves with IPv6 Internet access, there is currently little to no IPv6 content or services for this population to consume. Thus, there is little incentive for consumers to purchase next generation equipment such as network gateways that could support advanced simultaneous IPv4 and IPv6 connectivity.

BRIEF SUMMARY

This Summary is provided to introduce a selection of concepts in a simplified form that are further described below in the Detailed Description. This Summary is not intended to identify key features or essential features.

At least some aspects introduce a technique to enable IPv6 connectivity to existing subscribers where legacy and next generation home gateway equipment alike can be enabled to support IPv6. Various embodiments generally maintain legacy IPv4 behavior for routing and/or NAT while offering bridged IPv6 connectivity for IPv6 capable nodes.

It is known in the industry that next generation home gateways that support advanced IPv4 and IPv6 functionality can be used to provide simultaneous IPv4 and IPv6 connectivity including access to content and services. However, in many if not most cases this advanced behavior cannot be supported by legacy home gateways due to physical limitations including those associated with memory and or processor capabilities. Specifically, legacy devices either do not have sufficient memory or processing power to support the functionality that would be required. Certain aspects provide functions for IPv6 bridging which is substantially less complicated and requires fewer resources from the device itself. This light weight approach has the advantage of enabling equipment owners to upgrade their legacy equipment as disclosed below through enhancements in the equipment's firmware and/or hardware. The enhancements which enable the bridging of IPv6 data while maintaining support for IPv4 routing and/or IPv4 NAT services avoids the requirement for many of the processor and memory intensive advanced features often required to fully support IPv6.

In a first embodiment a network gateway receives packets from a network and distinguishes the packets as either conforming to a first communication protocol or a second communication protocol. The first and second protocols may be IPv4 and IPv6 respectively, or may be other similar protocols. For the first protocol packets, the network gateway performs network address translation of the destination address in the packet and forwards the translated packets from one or more physical ports on the gateway to specific customer equipment according to mapping information stored in the network gateway. For the second protocol packets, the network gateway determines which of the one or more physical ports are connected to customer equipment that is compatible with the second protocol. The first embodiment proceeds to forward the second protocol packets from all enabled physical ports without consideration of the specific destination address or other data in the second protocol packets.

In a second embodiment, the network gateway determines which of the physical ports are connected to customer equipment compatible with the second protocol by scanning the physical ports to detect second protocol communication traffic transmitted from the connected customer equipment. When second protocol communication traffic is detected on a physical port, mapping information is updated, based on one or more rules stored in the gateway, to enable or disable the port for forwarding of second protocol packets.

In a third embodiment, the network gateway receives packets on one or more of its physical ports from customer equipment and distinguishes the packets as either conforming to the first communication protocol or the second communication protocol. For the first protocol packets, the network gateway performs network address translation of the source address in the packets and forwards the translated packets from the provider network interface on the gateway to the provider network. For the second protocol packets, the network gateway determines which of the one or more physical ports are connected to customer equipment compatible with the second protocol. The third embodiment proceeds to forward, from its provider network interface, the second protocol packets received on all enabled physical ports to the provider network without consideration of the specific source address or other data in the second protocol packets.

In a fourth embodiment, the network gateway receives second protocol packets from the provider network that contain configuration information for assigning a second protocol address and/or port to second protocol compatible equipment connected to one of the physical ports. The fourth embodiment proceeds to forward these packets to the customer equipment from all ports enabled for second protocol packets.

In a fifth embodiment, a method is disclosed for upgrading legacy equipment supporting the first protocol, to also support the second protocol according the functions described above.

Other various embodiments include systems, other customer provided equipment, processes, and computer readable memory storing machine executable instructions for performing the functions of the embodiments described above.

BRIEF DESCRIPTION OF THE DRAWINGS

Some embodiments are illustrated by way of example, and not by way of limitation, in the figures of the accompanying drawings and in which like reference numerals refer to similar elements. For convenience, the first portion of each reference numeral corresponds to the drawing figure in which the referenced drawing element is first introduced.

FIG. 7 illustrates a flow diagram of at least one embodiment for determining ports to enable for IPv6 bridging.

FIG. 8 illustrates a flow diagram of at least one embodiment for enabling and disabling ports for IPv6 bridging.

DETAILED DESCRIPTION

Figure 1:
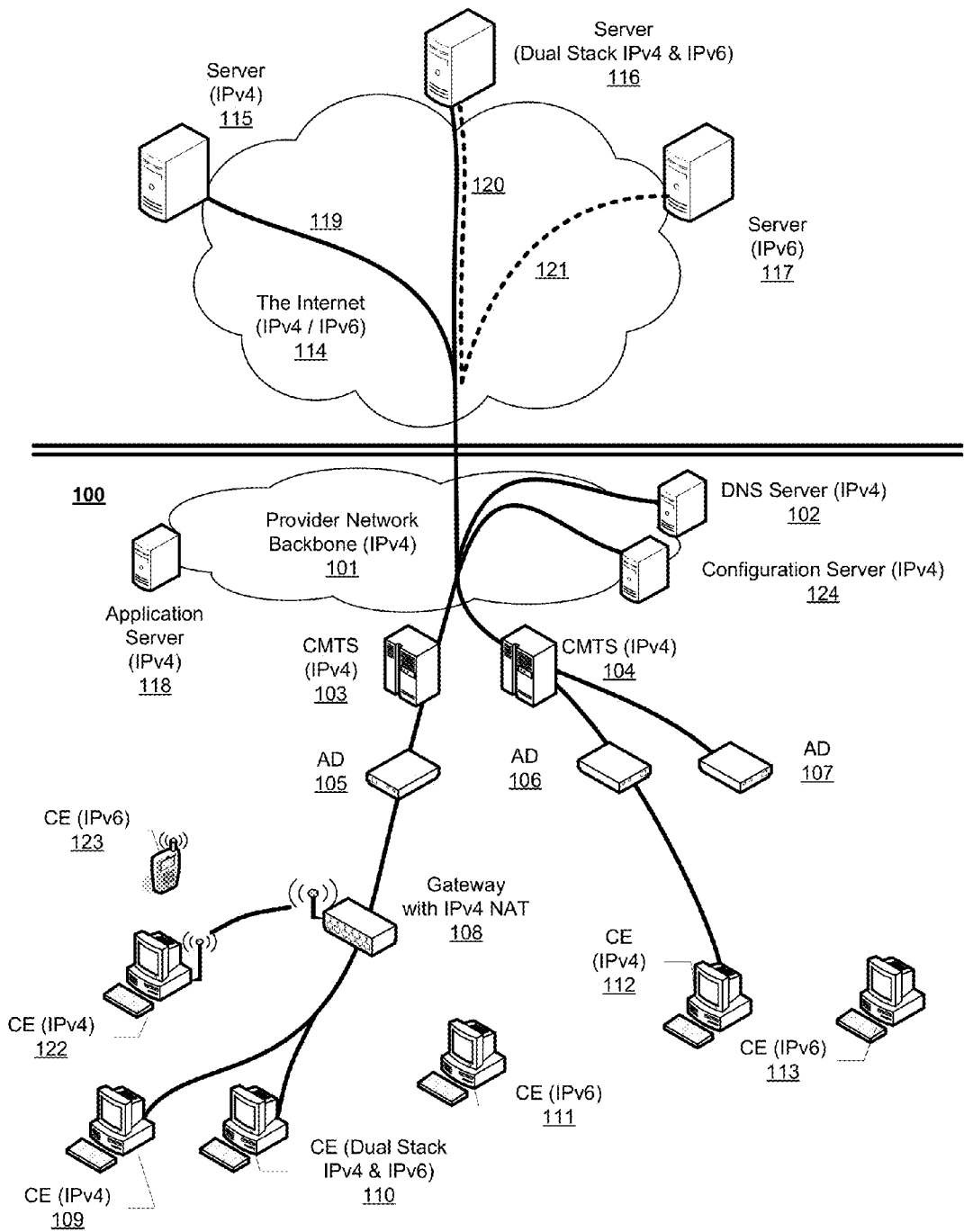
FIG. 1 illustrates a block diagram of a provider high speed data network supporting IPv4 Internet Protocol.

FIG. 1 is an illustrative network diagram. Network 100 illustrates a provider high speed data network that includes multiple access network segments serving individual subscribers over hybrid fiber coaxial (HFC) plants linked together through a provider network backbone 101. Network 100 provides High-Speed Internet (HSI) data service and other services (e.g., cable television, Voice over IP (VoIP) telephone service) to subscribing customers. To provide these services, the network 100 may contain a number of servers, such as Application server 118, DNS server 102, and Configuration server 124, accessible by subscriber locations through provider network backbone 101. Typically, each subscriber location has one or more types of subscriber access devices (AD) 105-107 that are used to communicate data between customer equipment devices (CE) 109-113, 122, and 123 and equipment connected through network 100 and Internet 114. Examples of customer equipment devices include, but are not limited to, personal computers (PC), other types of computers, gaming consoles, video and/or voice communication terminals, wireless data terminals, etc. Examples of access devices include, but are not limited to, cable modems, set top terminals, Media Terminal Adapters (MTA), etc.

Cable Modem Termination Systems (CMTS) 103 and 104 communicate with access devices in an access network portion of network 100. Although FIG. 1 only shows one access device 105 in the access network served by CMTS 103, and two access devices 106 and 107 in the access network served by CMTS 104, the presence of additional access devices in each access network may be assumed. As previously indicated, the access networks of CMTSs 103 and 104 are HFC networks. For convenience, optical nodes, splitters, amplifiers, and other data switch elements between CMTSs 103 and 104 and the access devices in their respective access networks are not shown. Each CMTS forwards upstream communications from the ADs to other locations in network 100, forwards data from the locations in network 100 downstream to those ADs, and controls the ability of each AD in its access network to communicate in network 100. CMTSs 103 and 104, as well as additional CMTSs, may connect to the provider network backbone 101 through optical fibers, local market routers and regional routers, or other data switches. The provider backbone 101 may contain additional optical fiber, routers, or other communication means.

Customer provided equipment (CPE), such as network gateway 108, may exist between customer equipment and access devices in order to perform various networking functions. For example network gateway 108 may be a home gateway forming a local area network (LAN) including CEs 109, 110, 111, 122, and 123 and providing a network connection between the LAN and access device 105. Network gateway 108 may also be equipment for forming municipal or other large wide area networks (WAN). Gateway 108 may be stand alone equipment as shown in FIG. 1, or may be combined with access device 105, or may be integrated or distributed among the various CEs 109, 110, 111, 122, and 123.

To avoid unnecessary complexity, only a small number of network elements are shown in FIG. 1. Numerous additional data switches such as routers, CMTSs, optical nodes, servers, gateways, subscriber devices, etc., would typically be present in an actual network.

High speed data networks such as network 100 and the Internet 114 utilize a set of communication protocols known as the Internet Protocol Suite (TCP/IP) established by the Internet Engineering Task Force (IETF) to facilitate communication between the various CEs, CPEs, ADs, CMTSs, servers, and other network devices. Applications running on CEs or servers may use TCP/IP, for example, to access or serve web sites, share files, play games, transmit and receive email, transmit and receive IP (Internet Protocol) television (IPTV), etc.

TCP/IP is defined in IETF publication RFC 1122 and consists of a communication protocol stack of four layers: the Link Layer, Internet Layer, Transport Layer, and Application layer. At the Internet Layer, two protocols have been widely deployed, Internet Protocol version 4 (IPv4) and Internet Protocol version 6 (IPv6) described in IETF publications RFC 791 and RFC 2460 respectively. Both protocols use Internet Protocol packets to communicate data between source and destination hosts based on addresses within the packets. In an Internet Protocol network (IPv4 or IPv6), every host computer connected to a network segment is assigned an IP address for identifying the host computer communications within that network. Currently the vast majority of CEs connected to the public Internet (through a network such as network 100 or otherwise) are configured to execute an IPv4 communication stack. IPv4 utilizes a dotted decimal format IP address field containing four numbers, each ranging from 0 to 255 (e.g. 73.1.322.65). This format provides a maximum of 4,294,967,296 possible addresses. As previously discussed, the number of available IPv4 addresses has reached a critically low level. IPv6, the designated successor to IPv4, provides approximately $3.4 \times 10^{38}$ addresses, which is $7.9 \times 10^{28}$ times as many addresses provided for by the IPv4 standard.

Figure 3A:
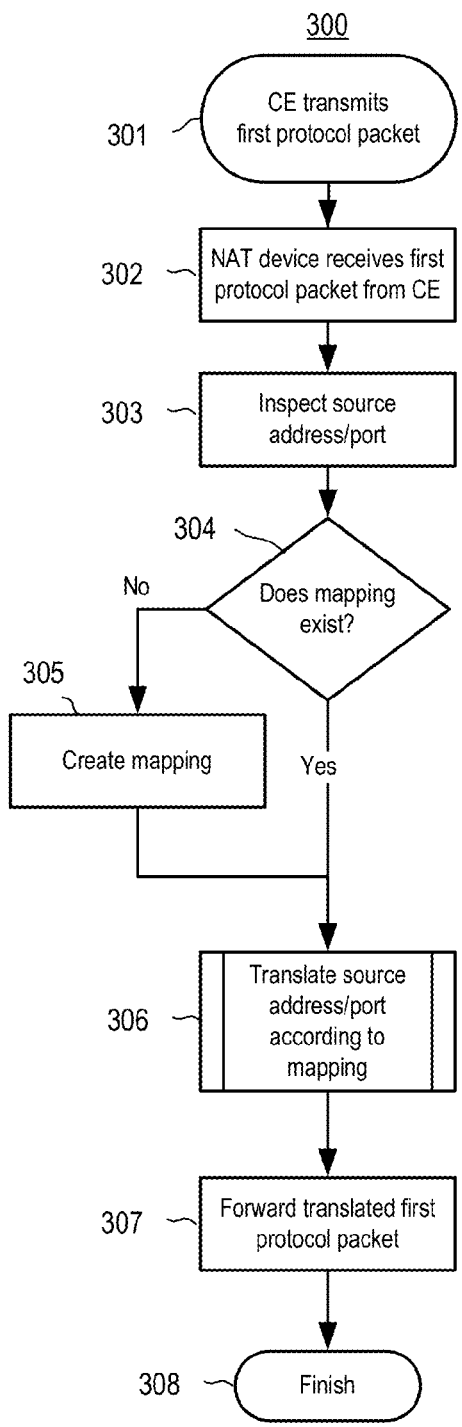
FIGS. 3A and 3B illustrate flow diagrams of a network address translation Service.
Figure 3B:
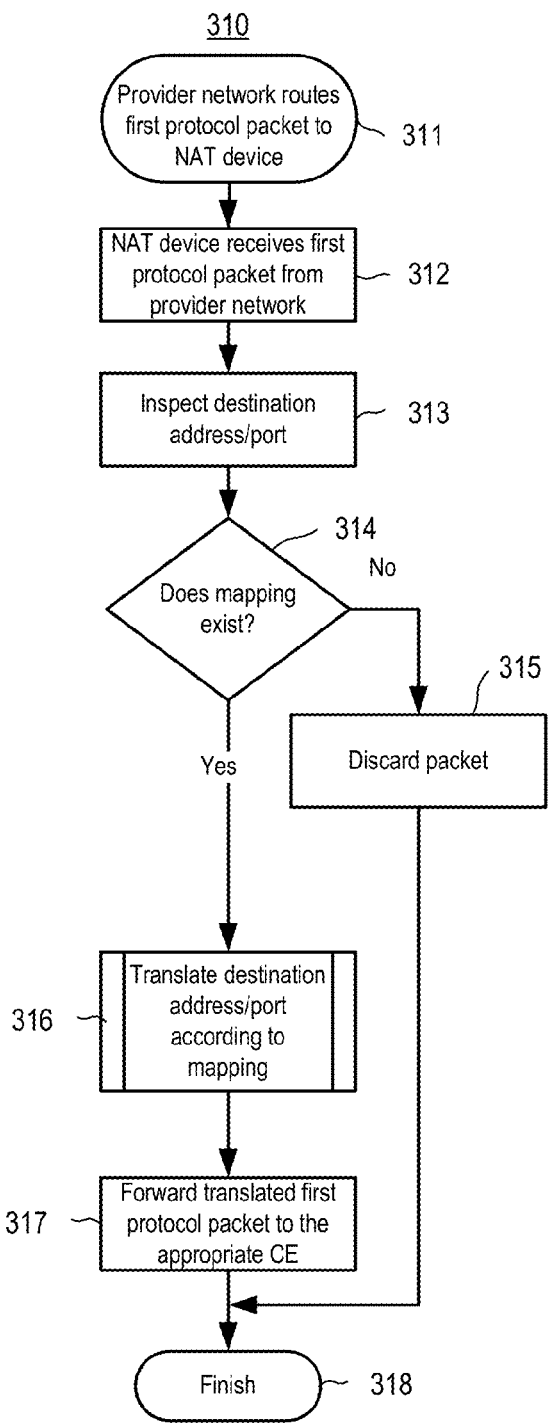

While IPv6 continues to be deployed, network address translation (NAT) remains an essential component in CPE to maintain connectivity to the Internet where available IPv4 addresses are limited. As discussed earlier, NAT enables several CEs to share a single IPv4 IP address on the public Internet. Using NAT, CEs behind a common NAT device each have a private IP address that is only used on the private network behind the NAT. FIG. 1 illustrates NAT implemented in the CPE gateway 108 at a customer's location. FIGS. 3A and 3B illustrate a general NAT process for outbound traffic transmitted from a CE (FIG. 3A) and for inbound traffic received by a CE (FIG. 3B). These processes are explained by way of example with respect to FIG. 1 as used with the IPv4 protocol.

The outbound process 300 begins when one of the CE, such as CE 109, transmits an IPv4 packet outside of a private LAN at beginning step 301. A NAT device, such as gateway 108, receives the packet in step 302, and, in step 303, inspects the IPv4 source address/port contained in the packet which designates the CE from which the packet came. This source address/port is privately assigned to CE 109, and has no meaning on any network (provider network 100 or the Internet 114) beyond gateway 108. Gateway 108 may have one or more public IPv4 assigned addresses by which it and the CEs behind the gateway are identified on the provider network 100. At step 304, gateway 108 determines if a mapping from the private address/port combination to one of its assigned public addresses/port combinations exist within a mapping table stored in gateway 108. If a mapping of the private address/port for CE 109 does not exist, gateway 108, at step 305, will create a unique mapping. The mapping of multiple private addresses/ports may be mapped to one of the common public IPv4 public addresses assigned to gateway 108, but in such a case, the multiple private addresses/ports will be mapped to different public ports. For example, CE 109 may have a private IPv4 address/port of 10.1.322.65/4000, and CE 110 may have a private IPv4 address port of 10.1.322.66/3000. If gateway 108 is assigned public IPv4 address/port 73.23.35.45, an example NAT mapping could be as follows.

TABLE 1

| CE | Port | Private Address/Port | Public Address/Port |
|---|---|---|---|
| CE 109 | 1 | 10.1.322.65/4000 | 73.23.35.45/1000 |
| CD 110 | 2 | 10.1.322.66/3000 | 73.23.35.45/1001 |
| CE 122 | 9 (Wireless) | 10.1.322.67/3000 | 73.23.35.45/1002 |

After a mapping for the CE 109 private address/port is created in step 305, or after it has been determined that a mapping already exists in step 304, gateway 108, in step 306, translates the source address/port in the packet according to the mapping. This requires gateway 108 to replace the private source address/port in the packet header with the mapped public address/port and to update a checksum in the packet to account for the new source address and port. For example, the source address 10.1.322.65/4000 in a packet received from CE 109 would be replaced with 73.23.35.45/1000 according to the mapping table. In step 307, gateway 108 forwards the translated packet to the provider network 100 via access device 105. Process 300 is finished in step 308.

The inbound process 310 in FIG. 3B is similar to process 300 in FIG. 3A and begins at step 311 when provider network 100 forwards an IPv4 packet to gateway 108 based on the packets destination address in the packet header. Gateway 108, receives the packet in step 312, and, in step 313, inspects the IPv4 destination address/port contained in the packet. In step 314, gateway 108 determines if a mapping exists from the inspected public destination address/port to a privately assigned address/port. If a mapping does not exist, gateway discards the packet in step 315 and proceeds to step 318 to finish the process. If a mapping does exist, gateway 108, in step 316, translates the destination address/port in the packet according to the mapping table. This requires gateway 108 to replace the public destination address/port in the packet header with the mapped private address/port and to update a checksum in the packet to account for the new destination address and port. The destination address may be, for example, 73.23.35.45/1000 in the packet received from the provider network 100 which would be replaced with 10.1.322.65/4000 according to the mapping table. In step 317, gateway 108 forwards the translated packet to the CE which is assigned the translated private address/port. Process 310 is then finished in step 318.

Returning again to FIG. 1, the block diagram illustrates Internet 114 with respect to IPv4 and IPv6 support. The Internet 114 predominantly consists of IPv4 enabled networks and equipment, such as network branch 119 and server 115. The Internet 114 also includes limited connectivity to IPv6 networks and equipment, such as network branch 121 and server 117. Other, networks and equipment, such as 120 and 116, may be dual stack IPv4/IPv6 networks and equipment which fully support both IPv4 and IPv6 Internet protocols simultaneously. "Dual stack" refers to the fact that such networks and devices implement two complete communication protocol stacks for IPv4 and IPv6 respectively.

FIG. 1 illustrates provider network 100 as an IPv4 only network, which is currently the predominant situation. The solid lines in FIG. 1 connecting the various CEs, CPEs, ADs, CMTSs, servers represent IPv4 support and connectivity. The dotted lines in FIG. 1 represent the limited IPv6 support and connectivity within Internet 114, but not available in provider network 100. As can be seen, such provider networks prevent customers from connecting IPv6 enabled equipment, such as CEs 110, 111, and 113, and 123 to access IPv6 content and services available over the Internet 114. Even if customers desired to acquire advanced IPv6 enabled devices such as CEs 111, 113, and 123, connectivity for such devices would not be natively available. Likewise, dual stack CEs, such as CE 110, are limited to IPv4 services and content only.

Figure 2:
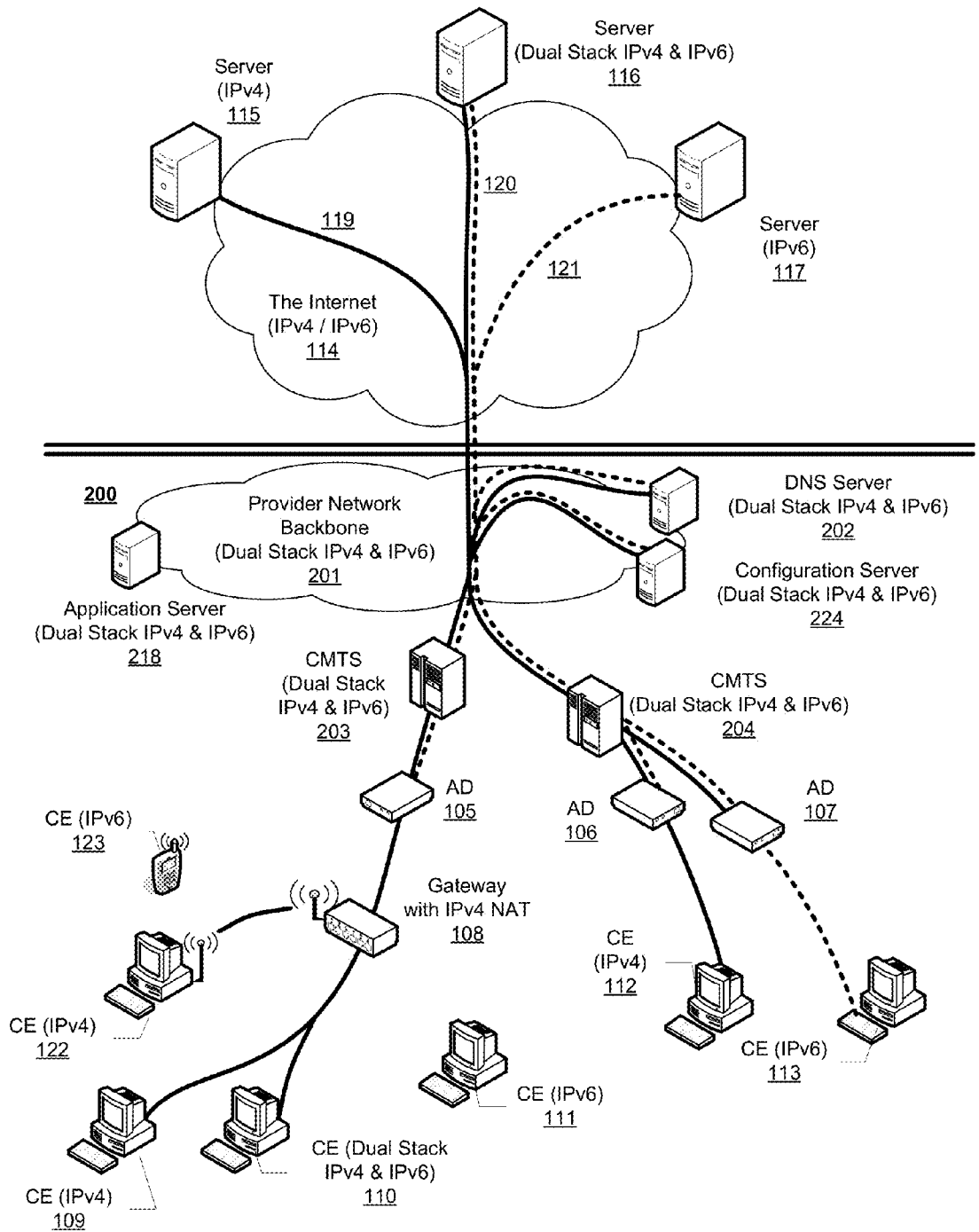
FIG. 2 illustrates a block diagram of a provider high speed data network supporting full dual stack IPv4 and IPv6 Internet Protocols with legacy IPv4 customer provided equipment attached.

FIG. 2 illustrates how this problem continues to persist even after the provider network has been upgraded to a dual stack IPv4/IPv6 network 200. An upgraded dual stack IPv4/IPv6 network may include upgraded devices such as Application server 218, DNS server 202, Configuration server 224, and CMTSs 203 and 204 which incorporate dual stack functionality. As shown, such networks provide IPv6 connectivity for CEs at customer locations where the CE is directly connected to the AD which provides a direct connection to the network. Such is the case for CE 113 directly connected to the provider network 200 through AD 107. However, this is not the typical case. Generally, most customer locations (whether residential, commercial, or municipal) include some sort of CPE, such as gateway 108, for implementing a local LAN or WAN with numerous CEs sharing a common AD 105 for connecting to the provider network 200. Customers will often find the cost or disruption of upgrading or replacing its LAN or WAN to support dual stack IPv4/IPv6 prohibitive or unjustifiable in view of the few number of IPv6 CEs that need support at a customer location and the small amount of IPv6 content and services available over Internet 114. This problem can be self-perpetuating as customers have little motivation for upgrading their private networks and CPE because IPv6 is not supported by the network provider and because little IPv6 content and services are available, and provider networks have little motivation for upgrading their networks because of little demand from customers which cannot support IPv6. In both FIG. 1, with the IPv4 provider network, and FIG. 2, with the dual stack IPv4/IPv6 network, the original problem of IPv4 address exhaustion continues to exist because the predominant number of CPE, CEs, and other devices requiring IPv4 addresses does not decrease.

Aspects of the various embodiments disclosed herein provide near term and long-term solutions for enabling IPv6 connectivity at a pace commensurate with the emerging availability of IPv6 access, content and services. In the short term, certain aspects enable IPv6 connectivity in legacy IPv4 equipment, enabling private networks and end-users (consumers) to upgrade to IPv6 while delaying or avoiding the upgrade costs. At least some aspects additionally provide the benefit of being light weight in terms of required memory and processing power. Thus, in addition to being a near term solution for upgrading legacy IPv4 equipment to support IPv6 connectivity, certain aspects provide a long term solution for next generation equipment at lower cost, size and power.

Figure 4:
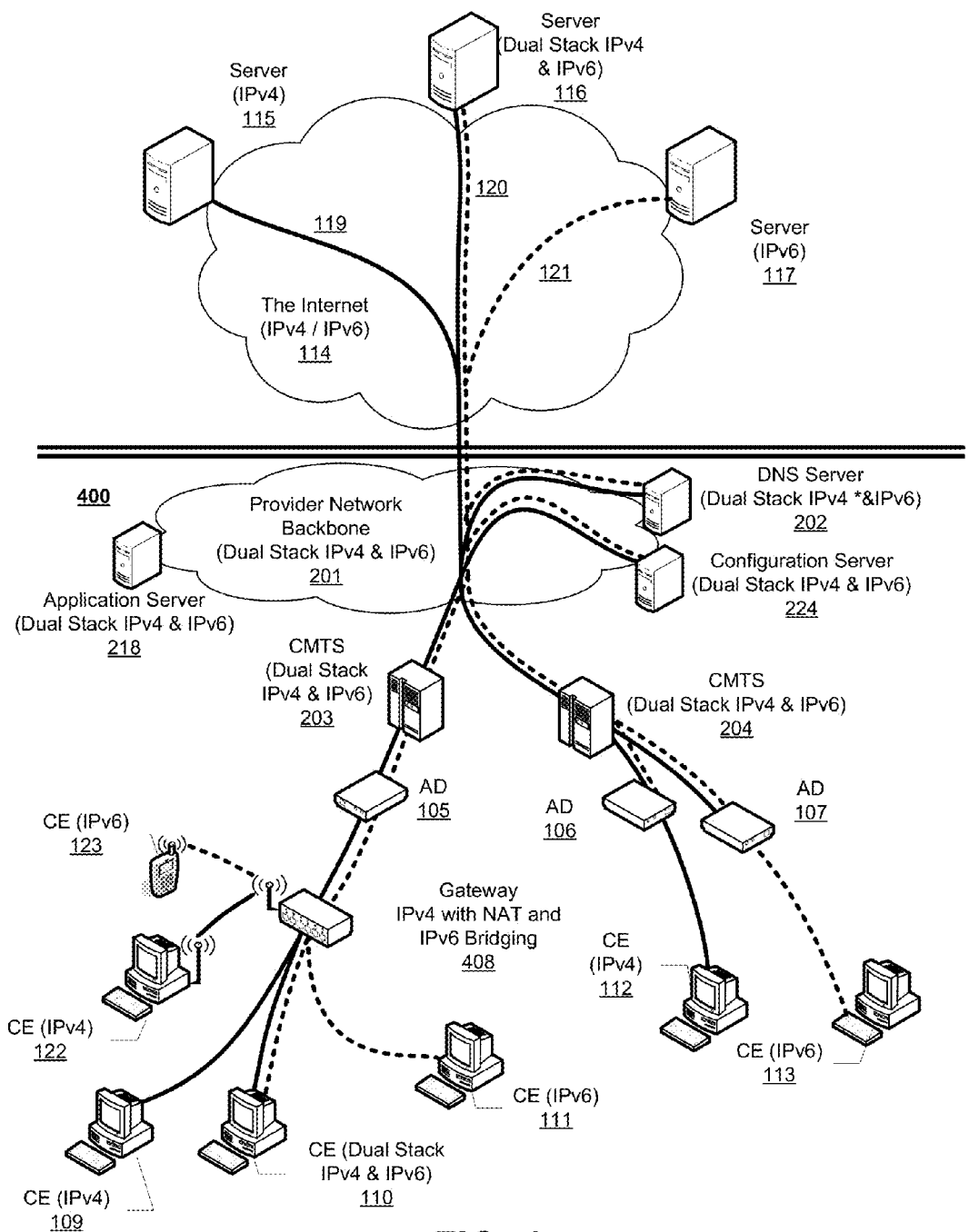
FIG. 4 illustrates a block diagram of a provider high speed data network in which at least some embodiments may be implemented.

FIG. 4 illustrates how certain embodiments may be deployed at a customer location to provide limited IPv6 access in addition to IPv4 access without the need for a complete dual stack IPv4/IPv6 implementation. FIG. 4 illustrates provider network 400 which is similar to provider network 200 with the exception that dual stack IPv4/IPv6 functionality is not completely deployed throughout the network. Instead, certain embodiments are configured to implement IPv4 NAT services combined with additional novel IPv6 bridging services. FIG. 4 illustrates novel IPv4 NAT/IPv6 bridging services that may be implemented in gateway 408. As shown, the addition of IPv6 bridging in gateway 408 permits connectivity of CEs 111 and 123 which was previously not provided in networks 100 or 200 illustrated in FIG. 1 and FIG. 2 respectively.

FIGS. 5-8 illustrate how IPv4 NAT/IPv6 bridging may be implemented in various embodiments such as gateway 408. These various embodiments, however, are not limited to just to gateway 408 and to the IPv4 and IPv6 protocols. The disclosed embodiments may be equally applied to other packet protocols that rely on source and destination addresses, and to other hardware and software platforms intended to serve similar routing functions of data using one or more packet protocols.

Figure 5:
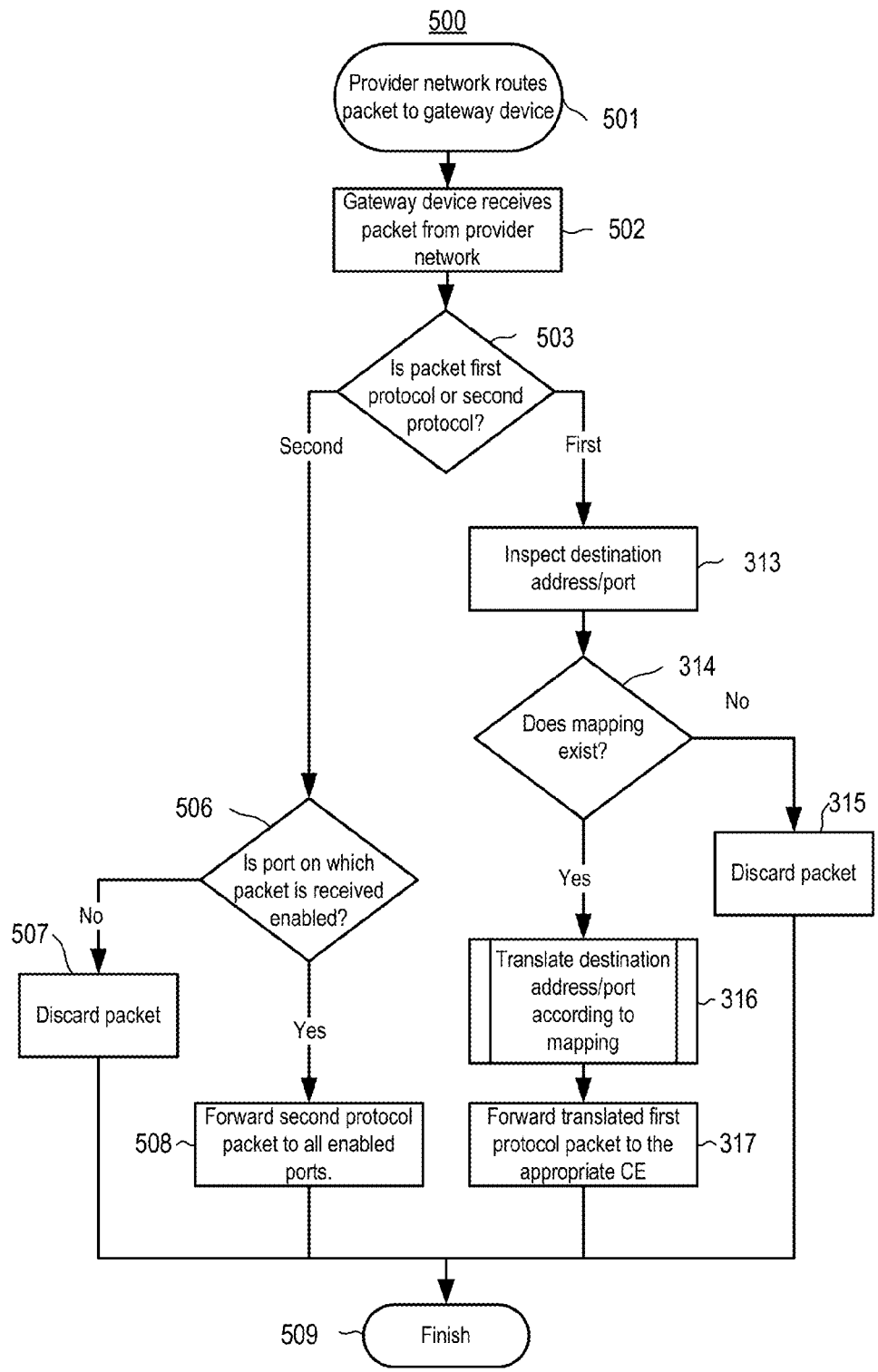
FIG. 5 illustrates a flow diagram of at least one embodiment for supporting IPv6 bridging of inbound IPv6 packets.

FIG. 5 illustrates a process 500 for routing packets to a CE from a network according to at least one illustrative embodiment. For convenience of example only, process 500 is described as being implemented in gateway 408. For clarity, this example will assume that gateway 408 is a home gateway with a single physical network interface to AD 105, four physical ports with each physical port supporting one physical CE connection, and a wireless port supporting multiple wireless CE connections. These assumptions are merely illustrative and should not be construed as limiting. The various embodiments may include physical ports that are hardwire, optical, or wireless connections or any other appropriate connection medium. By way of example, gateway 408 may also store in memory a mapping table as shown in Table 2 which associates public addresses/ports visible on the provider network with private addresses/ports of the CEs connected to the physical ports of gateway 408. As shown, the mapping table may also include an association of the CEs with a protocol type and with a physical port to which each CE is attached.

TABLE 2

| CE | Phys. Port | Protocol | Private Add./Port | Public Add./Port |
|---|---|---|---|---|
| CE 109 | 1 | IPv4 | 10.1.322.65/4000 | 73.23.35.45/1000 |
| CD 110 | 2 | IPv4 | 10.1.322.66/3000 | 73.23.35.45/1001 |
| CD 110 | 2 | IPv6 | | |
| CD 111 | 3 | IPv6 | | |
| EMPTY | 4 | | | |
| CE 122 | 9 (Wireless) | IPv4 | 10.1.322.67/3000 | 73.23.35.45/1002 |
| CE 123 | 9 (Wireless) | IPv6 | | |

Process 500 begins at step 501 where network provider 400 routes a packet to network gateway 408. The packet may be one of a first or second protocol type, which may be, for example, IPv4 and IPv6 respectively, or may be two other protocols. Gateway 408 receives the packet from provider network 400 in step 502, and determines whether the packet is either a first or second protocol type in step 503. The gateway may make this determination by inspection of the packet structure and contents.

If gateway 408 determines that the packet is of a first protocol type, the process performs steps similar to those in FIG. 3B which illustrates the NAT process for inbound IPv4 packets. For first protocol packets, the process may alternatively perform other legacy networking behavior. For first protocol packets, gateway 408 inspects the first protocol destination address/port contained in the packet in step 313. In step 314, gateway 408 determines if a mapping exists from this inspected public destination address/port to a privately assigned address/port. If a mapping does not exist, gateway 408 proceeds to step 315 to discard the packet, and then proceeds to step 509 to complete the process. If a mapping does exist, gateway 408 translates the destination address/port in the packet according to a mapping table stored in gateway 408 in step 316. This requires gateway 408 to replace the public destination address/port in the packet header with a mapped private address/port and to update a checksum in the packet to account for the new source address/port. The destination address may be, for example, 73.23.35.45/1000 in the packet received from the provider network 400 which would be replaced with 10.1.322.65/4000 according to the mapping table in Table 2. In step 317, gateway 408 forwards the translated packet to the CE which is assigned the translated private address. According to Table 2, in this example, CE 109 on physical port 1 is assigned the translated private address. Gateway 408 then proceeds to step 509 to complete the process.

Referring again to step 503, if gateway 408 determines that the packet is of the second protocol type, gateway 408 proceeds to step 506 in which gateway 408 determines if any of the physical ports are enabled for transmission of second protocol packets. If no ports are enabled for second protocol packets, gateway 408 proceeds to step 507 to discard the incoming packet, and then proceeds to step 509 to complete process 500. If, at step 506, gateway 408 determines that physical ports are enabled, gateway 408 proceeds to step 508 to forward the second protocol packet to CEs from all enabled ports and to not forward the second protocol packet from all disabled ports. After step 508, gateway 408 completes process 500 at step 509.

In performing process 500, gateway 408, or another device performing the process may perform the various steps in a different order, may combine certain steps, or may omit certain steps.

Figure 6:
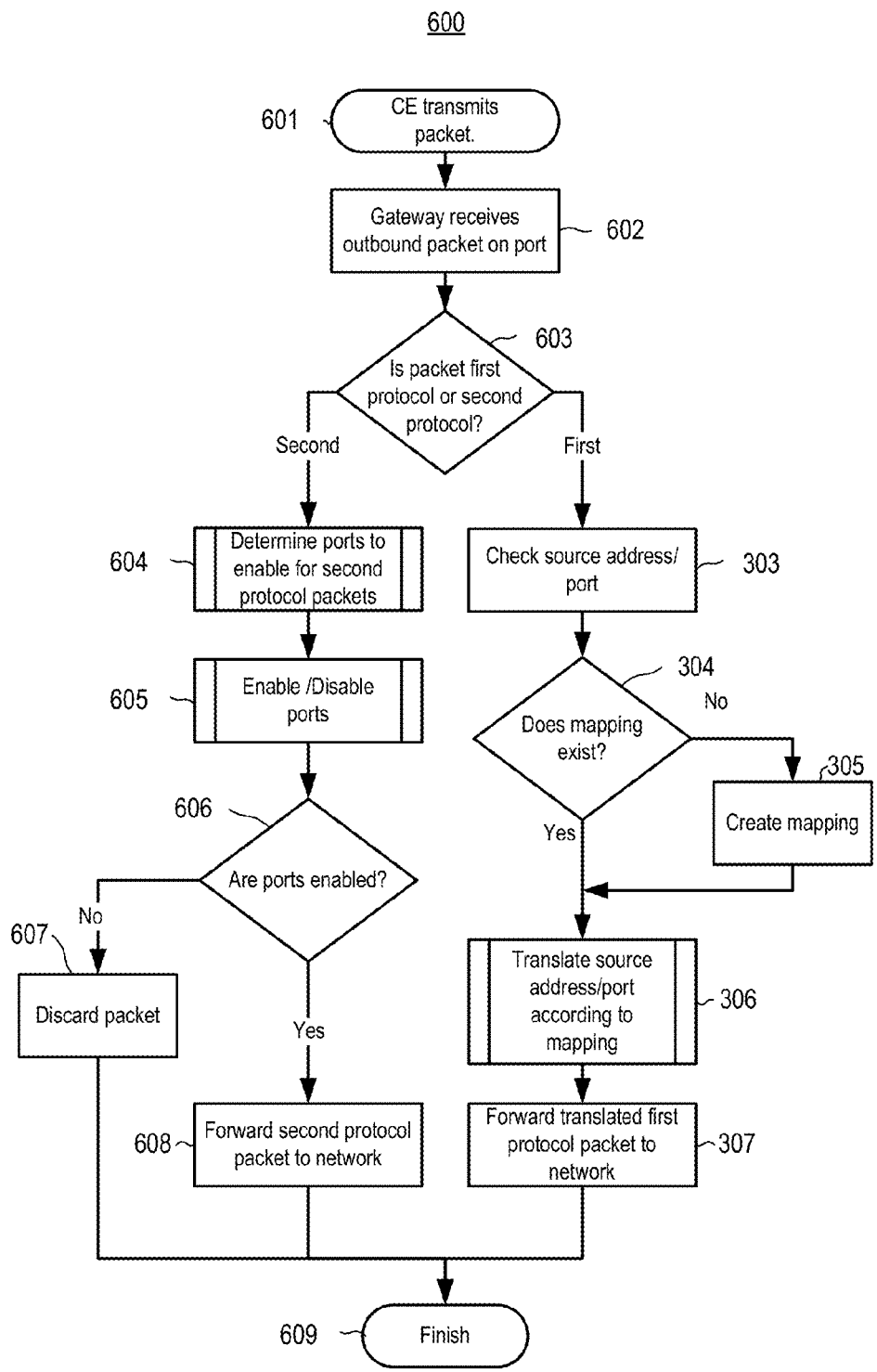
FIG. 6 illustrates a flow diagram of at least one embodiment for supporting IPv6 bridging of outbound IPv6 packets.

FIG. 6 illustrates process 600 for routing packets from a CE to the provider network according to at least one illustrative embodiment. Process 600 is an illustrative complementary process to process 500 illustrated in FIG. 5. Like process 500, this embodiment is described in an illustrative way as being performed by gateway 408 illustrated in FIG. 4. Process 600 begins at step 601 when one of CEs 109, 110, 111, 122, or 123 transmits a packet to one of the physical or wireless ports on gateway 408. At step 602, gateway 408 receives the packet and proceeds to determine if the packet is of a first protocol or second protocol in step 603. The gateway may make this determination by inspection of the packet structure and contents.

If gateway 408 determines that the packet is of a first protocol type, the gateway proceeds to performs steps similar to those in FIG. 3A which illustrates the NAT process for outbound IPv4 packets. The process may alternatively perform some other legacy networking function for first protocol packets. Assuming NAT is performed for first protocol packets, gateway 408 inspects the first protocol source address/port contained in the packet in step 303. The source address/port identifies the CE from which the packet was transmitted. At step 304, gateway 408 determines if a mapping from the private address/port combination to one of its assigned public addresses/port combinations exist within the mapping table stored in gateway 408. If no mapping for the private address/port exists, gateway 408 will create a unique mapping at step 305.

For example, CE 110 may have transmitted an IPv4 packet and have a private IPv4 address/port of 10.1.322.65/3000 and gateway 408 may have an assigned public IP address 73.23.35.45. Gateway 408 would inspect the mapping of table 2, and find that CE 109 has already been mapped to public address/port 73.23.35.45/1000. If CE 110 has not already been assigned a public address/port, gateway 408 would create a mapping entry such as the second entry in Table 2, mapping CE 110 to public address/port 73.23.35.45/1001. The example in Table 2 illustrates the CEs being mapped to the same public address as CE 109, but to a different port.

After creating a mapping in step 305, or determining that a mapping already exists in step 304, gateway 408, in step 306, translates the source address/port in the packet according to the mapping table. This requires gateway 408 to replace the private source address/port in the packet header with the mapped public address/port and to update a checksum in the packet to account for the new source address and port. For example, the source address 10.1.322.65/4000 in the packet received from CE 109 would be replaced with 73.23.35.45/1000 according to the mapping table. In step 307, gateway 408 forwards the translated packet to the provider network 400 via access device 105. The gateway then completes process 600 in step 609.

Referring again to step 603, if gateway 408 determines that the packet received from the CE is of a second protocol type, an IPv6 packet for example, gateway 408 proceeds to step 604. At step 604, gateway 408 determines on which physical ports to receive (or forward) second protocol packets from (or to) the CEs. This determination may be based on a static configuration of the ports, such as when a customer manually sets the configuration, or may be dynamically determined as, for example, already described with respect to FIG. 7. As illustrated in FIG. 7, one illustrative way of dynamically determining which ports to enable or disable for the second protocol packets is based on communication between gateway 408 and each of the CEs connected to the gateway. Beginning the process at step 701, gateway 408 scans each of the physical ports in step 702 for second protocol packet traffic. This traffic may be in the form of second protocol packets transmitted from a CE to gateway 408, may be second protocol packets transmitted between CEs attached to common physical port of the gateway, or may be some other form of communication or signal from a CE through the physical port or through some other communication path between the CE and the gateway. Proceeding to step 703, if no second protocol traffic is detected, the process may be repeated at step 702. The manner in which the scanning is repeated may be based on periodic polling or may be event driven. One illustrative event that could trigger the scanning step 702 is the detection of communication traffic on one or more of the physical ports or on the provider network interface. Scanning may be triggered by other events as well, such as by a change in the configuration of gateway 408, by other processes occurring within gateway 408, or by triggers external to gateway 408. If at step 703 second protocol traffic is detected, gateway 408 proceeds to 704 to determine on which ports second protocol traffic was detected, and then to 705 to update configuration data used to enable or disable the physical ports for second protocol traffic.

As an example, gateway 408 may have detected at step 702 that CE 111 transmitted an IPv6 packet to gateway 408 for transmission through the provider network 400 to server 117 on the Internet 114. Based on detecting that the packet was an IPv6 packet, gateway 408 might update the mapping table as shown in table 2 to indicate in the "Protocol" column that CE 111 was an IPv6 enabled device (already shown). After the configuration data is updated, the process repeats at step 702 in the periodic polling or event driven manner just described. Additionally, when the process first starts in step 701, it may proceed directly to scanning the ports in step 702 or, alternatively, it may wait in the periodic polling or event driven manner as just described. Process 700 may also proceed independently of process 600 and may run in the background on a continual basis.

Regardless of how gateway 408 determines from which ports to send second protocol packets, the port configuration may be stored and updated in the mapping table as illustrated in Table 2, or may be stored in some other table or form such as in a hardware register, electromechanical switch/connection, etc.

Returning to FIG. 6, step 604, after gateway 408 has determined which ports to enable or disable, gateway 408 proceeds to step 605 to enable or disable the ports for second protocol transmission based on the determination made in step 604. An illustrative process for enabling/disabling the physical ports is illustrated in FIG. 8. Beginning at 801, gateway 408 proceeds to retrieve the port configuration data in step 802, determine what changes are reflected in the port configuration data from the present enable/disable states of the physical ports in step 803, and then update the physical port enable/disable states according to the changes in step 804. After step 804, process 800 may end or may return to 802 in a polling mode or event driven mode. Process 605 may also proceed independent of process 600 and may run in the background on a continual basis.

Returning to FIG. 6, after performing step 605, gateway 408 proceeds to step 606 in which gateway 408 determines if the physical port on which the second protocol packet is received from the CE is enabled for reception of second protocol packets. If the port is not enabled for reception of second protocol packets, gateway 408 proceeds to step 607 to discard the incoming packet, and then proceeds to step 609 to complete process 600. If, at step 606, gateway 408 determines that the physical port on which the second protocol packet is received is enabled for reception of second protocol packets, gateway 408 proceeds to step 608 to forward the second protocol packet to the provider network 400. Gateway 408 may also forward the second protocol packet to other ports enabled for reception or transmission of second protocol packets as determined in processes 604 and 605. After step 608, gateway 408 completes process 600 at step 609.

In performing process 600, gateway 408, or other various devices performing the process may perform the various steps in a different order, may combine certain steps, or may omit certain steps. One illustrative alternate embodiment may, for example, omit steps 604 and 605, in which case, the port configuration would be statically fixed. Various illustrative embodiments may also combine the processes illustrated in FIGS. 5-8 as would be applicable for different configurations of networks.

According to various illustrative embodiments first protocol type packets, such as IPv4 packets, are handled in a similar manner to legacy equipment previously described with respect to FIG. 1. In doing so, the various illustrative embodiments maintain separate domains for the private network and the public network for first protocol packets with each domain having a separate set of first protocol addresses. But, for second protocol type packets, such as IPv6 packets, the various illustrative embodiments bridge packets through the equipment without altering the packets. In this manner, the equipment is transparent to the second protocol traffic, resulting in the second protocol compatible CEs performing configuration functions directly with the provider network as if the equipment is not present.

Such configuration functions may include Dynamic Host Configuration Protocol applications in which the CE, such as CE 111, initiates configuration by sending a broadcast message to a DHCP server, such as configuration server 224. The DHCP server manages assignment of IP addresses and other configuration data for CEs on the network. After receiving the broadcast message, the DHCP server responds to CE 111 with an IP address assignment and other configuration information necessary for communication on the network. For various illustrative embodiments, the DHCP server would send IPv6 address information directly to CE 111 to enable CE 111 to communicate directly on the network. During this configuration of IPv6 information, Gateway 408 appears transparent to the IPv6 communications.

Operating in this manner, the various illustrative embodiments join the public and private networks into one IPv6 domain having a common set of second protocol addresses. Such transparency is different than the behavior of equipment implementing a full second protocol communication stack where the stack may perform address assignments, NAT, or other advance routing and/or security features. While this approach of joining the public and private networks into a common IPv6 domain provides less capability than a full dual communication stack, this approach has the advantage of requiring less memory and processing power. Consequently, various aspects can be implemented in legacy equipment that customers already own.

Various aspects include installing an update that modifies software on the legacy equipment to provide additional IPv6 bridging functionality. The update may be in the form of software, firmware, or other computer readable instructions that can be locally installed in the legacy equipment through various data interfaces on the equipment, or can be remotely installed in the legacy equipment from a remote server communicating with the legacy equipment through the network to which the legacy equipment is attached. The updates may also be in the form of a hardware upgrade such as installing a new read-only memory containing modified software into the legacy device. Because new equipment is not required, customers and provider networks can enable second protocol connectivity when second protocol services and content become available or required without a large up-front investment. Further, upgrading legacy equipment does not require a complete change-out of the legacy equipment, and would thus minimize disruptions at the customer location.

As previously described, some embodiments may be implemented in CPE, such as gateway 408, which may form part of a private network such as a residential, commercial, or municipal LAN or WAN. Other types of CPE devices which may incorporate and/or benefit from various aspects of the disclosed embodiments can include cordless or wired telephones, Set Top Terminals, game consoles, etc. The various embodiments may be incorporated with components performing additional operations. For example, gateway 408 may be incorporated with an access device such as cable modem. Whether as CPE or provider network equipment, the various embodiments can provide data transmission between two networks or end devices, with each network or end device on a physical layer (e.g., wired or wireless) using protocols such as IPv4 and IPv6 which are specific to the network or end device. The IPv4 and IPv6 protocols are used herein as illustrative examples of how at least some of the disclosed embodiments may be practically applied. The disclosed embodiments are equally applicable to other communication protocols as is required by the specific network and/or end device.

Figure 9:
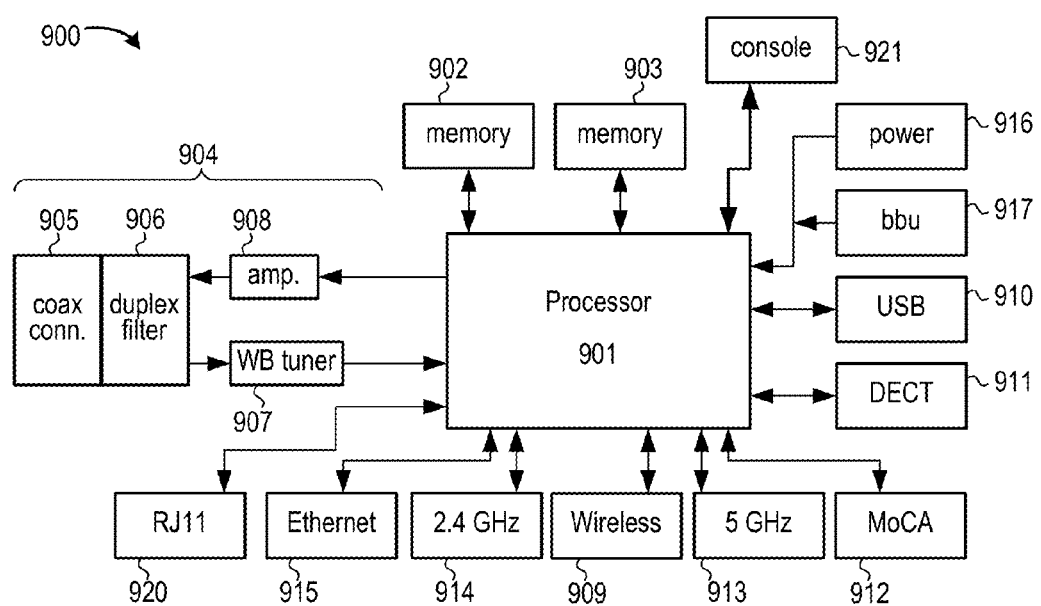
FIG. 9 is a partially schematic block diagram of a computing platform according to at least some embodiments.

FIG. 9 is a block diagram of equipment 900 in which the various disclosed embodiments may be implemented. A main processor 901 is configured to perform various Link, Internet, Transport, Application, or other communication stack layer operations, and to control operation of other components of equipment 900. Processor 901 may be implemented with any of numerous types of devices, including but not limited to one or more general purpose microprocessors, one or more application specific integrated circuits, one or more field programmable gate arrays, and combinations thereof. In at least some embodiments, processor 901 carries out operations described herein according to machine readable instructions (e.g. software, firmware, etc.) stored in memory 902 and 903 and/or stored as hardwired logic gates within processor 901. Processor 901 communicates with and controls memory 902 and 903 and other components within 900 over one or more buses.

Main processor 901 communicates with networks or end devices across one or more RF interfaces 904 that may include a coaxial cable connector 905, a diplex filter 906, a wideband tuner 907 and an upstream communication amplifier 908. Main processor 901 may also communicate with the networks or end devices through various additional interfaces that include additional hardware and/or firmware. Such interfaces can include one or more USB interfaces 910, DECT 6.0 interfaces 911, MOCA (Multimedia Over Coax) interfaces 912, 2.4 GHz Wi-Fi interfaces 914, 5 GHz Wi-Fi interfaces 913, other wireless interfaces 909, Ethernet interfaces 915, RJ11 interfaces 920, etc. A power supply 916 and/or battery backup 917 may provide electrical power. User input to equipment 900 may be provided over one of the aforementioned interfaces or via a separate collection of buttons, infrared ports, or other controls in a console 921.

Memory 902 and 903 may include volatile and non-volatile memory and can include any of various types of storage technology, including one or more of the following types of storage devices: read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory.

In at least some embodiments, each of gateway 408, and other equipment which could appropriately perform the various described processes can be implemented as multiple computing platforms, such as multiple equipment 900, for redundancy and/or to increase the amount of analysis, data storage and other operations being performed simultaneously.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatuses, modules, systems, and machine-readable storage memory. Any and all permutations of features from the above-described embodiments are within the scope of the invention.

The invention claimed is:

1. An apparatus comprising:
    a network interface;
    a plurality of ports;
    a processor; and
    memory storing computer readable instructions that when executed by the processor, cause the apparatus to:
        receive first and second external packets at the network interface and a plurality of other packets, which are not external packets, at one or more ports of the plurality of ports, wherein the first external packet conforms to IPv4 and the second external packet conforms to IPv6;
        identify a subset of the plurality of ports that includes ports that receive at least one packet, of the plurality of other packets, that conforms to IPv6;
        enable the transmission of IPv6 packets on the subset of the plurality of ports;
        disable the transmission of IPv6 packets on at least one port not contained in the subset of the plurality of ports;
        transmit the first external packet from one of the plurality of ports based on a destination address in the first external packet and a predetermined mapping particular to IPv4;
        transmit the second external packet from each of the subset of the plurality of ports irrespective of any destination address; and
        prevent transmission of the second external packet from the at least one disabled port and discard the second external packet.

2. The apparatus of claim 1, wherein the instructions, when executed by the processor, further cause the apparatus to translate the destination address to a different destination address according to the predetermined mapping, wherein the first external packet transmitted from the one of the plurality of ports includes the different destination address.

3. The apparatus of claim 2, wherein the instructions, when executed by the processor, further cause the apparatus to:
    identify at least one additional packet, of the plurality of other packets, that conforms to IPv4;
    translate a source address within the at least one additional packet to a different source address according to the predetermined mapping; and
    transmit the at least one additional packet including the different source address from the network interface.

4. The apparatus of claim 1, wherein the instructions, when executed by the processor, further cause the apparatus to identify the subset of the plurality of ports from configuration data stored in the memory.

5. The apparatus of claim 1, wherein the instructions, when executed by the processor, further cause the apparatus to transmit, from the network interface, the at least one packet, of the plurality of other packets, that conforms to IPv6.

6. The apparatus of claim 5, wherein the instructions, when executed by the processor, further cause the apparatus to:
    receive, at the network interface, packets conforming to IPv6 responsive to the at least one packet of the other packets transmitted from the network interface, the responsive packets containing configuration data for assigning an IPv6 address to a client connected to one of the subset of the plurality of ports wherein the IPv6 address does not match an IPv6 address assigned to the network interface; and transmit, from the subset of the plurality of ports, the responsive packets containing the configuration data.

7. The apparatus of claim 1, wherein the instructions, when executed by the processor, further cause the apparatus to:
continually monitor the plurality of ports;
update the subset of the plurality of ports based on the monitoring; and
enable or disable one of the plurality of ports based on the updating.

8. A method comprising:
receiving first and second external packets from a network and a plurality of other packets, which are not external packets, at one or more ports of a plurality of ports communicatively coupled to client devices, wherein the first external packet conforms to IPv4 and the second external packet conforms to IPv6;
identifying a subset of the plurality of ports that includes ports receiving at least one packet, of the plurality of other packets, that conforms to IPv6;
enabling the transmission of IPv6 packets on the subset of the plurality of ports;
disabling the transmission of IPv6 packets on at least one port contained in the subset of the plurality of ports;
transmitting the first external packet from one of the plurality of ports based on a destination address in the first external packet and a predetermined mapping particular to IPv4;
transmitting the second external packet from each of the subset of the plurality of ports irrespective of any destination address; and
preventing transmission of the second external packet from the at least one disabled port and discarding the second external packet.

9. The method of claim 8, further comprising:
translating the destination address to a different destination address according to the predetermined mapping, wherein the first external packet transmitted from the one of the plurality of ports includes the different destination address.

10. The method of claim 9, further comprising:
identifying at least one additional packet, of the plurality of other packets, that conforms to IPv4;
translating a source address within the at least one additional packet to a different source address according to the predetermined mapping; and
transmitting the at least one additional packet including the different source address to the network.

11. The method of claim 8, further comprising:
identifying the subset of the plurality of ports from configuration data stored in a memory.

12. The method of claim 8, further comprising:
transmitting, to the network, the at least one packet, of the plurality of other packets, that conforms to IPv6.

13. The method of claim 12, further comprising:
receiving, from the network, packets conforming to IPv6 responsive to the at least one packet of the other packets transmitted to the network, the responsive packets containing configuration data for assigning an IPv6 address to a client connected to one of the subset of the plurality of ports wherein the IPv6 address does not match an IPv6 address assigned to a network interface; and
transmitting, from the subset of the plurality of ports, the responsive packets containing the configuration data.

14. The method of claim 8, further comprising:
continually monitoring the plurality of ports;
updating the subset of the plurality of ports based on the monitoring; and
enabling or disabling one of the plurality of ports based on the updating.

15. Non-transitory computer readable memory storing computer-executable instructions that, when executed by a processor, cause an apparatus to:
receive first and second external packets at a network interface and a plurality of other packets, which are not external packets, at one or more of a plurality of ports, wherein the first external packet conforms to IPv4 and the second external packet conforms to IPv6;
identify a subset of the plurality of ports that includes ports that receive at least one packet, of the plurality of other packets, that conforms to IPv6;
enable the transmission of IPv6 packets on the subset of the plurality of ports;
disable the transmission of IPv6 packets on at least one port not contained in the subset of the plurality of ports;
transmit the first external packet from one of the plurality of ports based on a destination address in the first external packet and a predetermined mapping particular to IPv4;
transmit the second external packet from each of the subset of the plurality of ports irrespective of any destination address; and
prevent transmission of the second external packet from the at least one disabled port and discard the second external packet.

16. The non-transitory computer readable memory of claim 15, wherein the instructions, when executed by the processor, further cause the apparatus to translate the destination address to a different destination address according to the predetermined mapping, wherein the first external packet transmitted from the one of the plurality of ports includes the different destination address.

17. The non-transitory computer readable memory of claim 16, wherein the instructions, when executed by the processor, further cause the apparatus to:
identify at least one additional packet, of the plurality of other packets, that conforms to IPv4;
translate a source address within the at least one additional packet to a different source address according to the predetermined mapping; and
transmit the at least one additional packet including the different source address from the network interface.

18. The apparatus of claim 15, wherein the instructions, when executed by the processor, further cause the apparatus to identify the subset of the plurality of ports from configuration data stored in the non-transitory computer readable memory.

19. The non-transitory computer readable memory of claim 15, wherein the instructions, when executed by the processor, further cause the apparatus to transmit, from the network interface, the at least one packet, of the plurality of other packets, that conforms to IPv6.

20. The non-transitory computer readable memory storing computer-executable instructions of claim 15 that, when executed by a processor, further cause the apparatus to:
continually monitor the plurality of ports;
update the subset of the plurality of ports based on the monitoring; and
enable or disable one of the plurality of ports based on the updating.

* * * * *